(12) United States Patent
Johnson et al.

(10) Patent No.: US 10,572,854 B2
(45) Date of Patent: Feb. 25, 2020

(54) ORDER GROUPING IN WAREHOUSE ORDER FULFILLMENT OPERATIONS

(71) Applicant: Locus Robotics Corporation, Wilmington, MA (US)

(72) Inventors: Ryan Johnson, Ashland, MA (US); Michael Charles Johnson, Ashland, MA (US); Sean Johnson, Danvers, MA (US); Bruce Welty, Boston, MA (US)

( * ) Notice: Subject to any disclaimer, the term of this patent is extended or adjusted under 35 U.S.C. 154(b) by 307 days.

(21) Appl. No.: 15/807,672

(22) Filed: Nov. 9, 2017

(65) Prior Publication Data
US 2019/0138978 A1    May 9, 2019

(51) Int. Cl.
  *G06Q 10/08*   (2012.01)
(52) U.S. Cl.
  CPC .......... *G06Q 10/087* (2013.01); *G06Q 10/08* (2013.01); *G06Q 10/0835* (2013.01)
(58) Field of Classification Search
  CPC ................. G06Q 10/087; G06Q 10/08; G05D 2201/0216; Y10S 901/01
  See application file for complete search history.

(56) References Cited

U.S. PATENT DOCUMENTS

| | | | |
|---|---|---|---|
| 6,876,958 B1 | 4/2005 | Chowdhury et al. | |
| 8,244,603 B1* | 8/2012 | Tang | G06Q 10/087 |
| | | | 705/28 |
| 8,560,114 B2 | 10/2013 | Suess et al. | |
| 8,571,915 B1* | 10/2013 | Wong | G06Q 10/06 |
| | | | 705/7.26 |
| 8,827,619 B2 | 9/2014 | Schafer | |
| 9,373,098 B2 | 6/2016 | Nashif et al. | |
| 2009/0129902 A1 | 5/2009 | Schafer | |
| 2011/0035247 A1* | 2/2011 | Perry | G06Q 10/06 |
| | | | 705/7.38 |
| 2012/0330458 A1* | 12/2012 | Weiss | B65G 1/1378 |
| | | | 700/216 |
| 2013/0317642 A1* | 11/2013 | Asaria | G06Q 10/08 |
| | | | 700/216 |
| 2014/0040075 A1* | 2/2014 | Perry | G06Q 30/0635 |
| | | | 705/26.81 |
| 2015/0032252 A1* | 1/2015 | Galluzzo | B25J 5/007 |
| | | | 700/218 |
| 2015/0120514 A1* | 4/2015 | Deshpande | G06Q 10/08355 |
| | | | 705/28 |
| 2017/0036859 A1 | 2/2017 | Lopes Ribeiro | |

(Continued)

OTHER PUBLICATIONS

International Search Report and Written Opinion, dated Jan. 4, 2019, received in international patent application No. PCT/US2018/059621, 11 pages.

*Primary Examiner* — A. Hunter Wilder
(74) *Attorney, Agent, or Firm* — Verrill; John W. Powell

(57) ABSTRACT

A method for grouping a plurality of orders in an order queue of a warehouse management system, each order including one or more items and each item being associated with a physical location in a warehouse. The method includes determining a physical location in the warehouse of each item in the plurality of orders. For each order, the method also includes establishing at least one cluster region, each cluster region including at least one item from the respective order. The method further includes grouping the plurality of orders based on the physical locations of the cluster regions in the warehouse to form at least one order set.

24 Claims, 17 Drawing Sheets

(56) References Cited

U.S. PATENT DOCUMENTS

| | | |
|---|---|---|
| 2017/0158430 A1 | 6/2017 | Raizer |
| 2017/0278047 A1 | 9/2017 | Welty et al. |
| 2018/0300800 A1* | 10/2018 | Rajkhowa ............ G06Q 10/083 |
| 2018/0330316 A1* | 11/2018 | Rajkhowa ............ G06Q 10/087 |

* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| | Location | Fiducial ID |
|---|---|---|
| 402a | L01001A | 11 |
| 402b | L01001B | 11 |
| 402c | L01001C | 11 |
| 402d | L01001D | 11 |
| 402e | L01001E | 11 |
| 402f | L01001F | 11 |
| | L01002A | 12 |
| | L01002B | 12 |
| | L01002C | 12 |
| | L01002D | 12 |
| | L01002E | 12 |
| | L01003A | 13 |
| | L01003B | 13 |
| | L01003C | 13 |
| | L01003D | 13 |
| | L01003E | 13 |
| | L01003F | 13 |
| | L01004A | 14 |
| | L01004B | 14 |
| | L01004C | 14 |
| | L01004D | 14 |
| | L01004E | 14 |
| | L01005A | 15 |
| | L01005B | 15 |
| | L01005C | 15 |
| | L01005D | 15 |
| | L01005E | 15 |
| | L01005F | 15 |

400 — table; 404 — header row

| | | 654 | | 656 | | 658 | | 680 |
|---|---|---|---|---|---|---|---|---|
| | 652 | | | | | | | |
| | Order | X1 | Y1 | X2 | Y2 | X3 | Y3 | Score |
| 660 → | 107387396 | 57.56 | 37.23 | 57.38 | 68.52 | 73.30 | 57.88 | 0 |
| | 107387878 | 54.83 | 45.06 | 57.36 | 66.47 | 73.44 | 58.20 | 11 |
| | 107388221 | 65.31 | 25.35 | 57.38 | 68.52 | 73.09 | 57.25 | 15 |
| | 107387014 | 62.63 | 33.17 | 60.00 | 61.80 | 73.14 | 54.54 | 16 |
| | 107387663 | 62.51 | 55.52 | 57.38 | 68.52 | 75.67 | 55.62 | 22 |
| | 107388420 | 62.62 | 40.43 | 63.74 | 55.32 | 74.66 | 57.34 | 22 |
| | 107387703 | 60.24 | 25.32 | 57.38 | 68.52 | 78.14 | 68.61 | 24 |
| | 107387582 | 60.14 | 32.02 | 62.62 | 40.98 | 74.27 | 70.46 | 47 |
| | 107388362 | 60.24 | 25.32 | 75.76 | 49.61 | 69.14 | 71.72 | 53 |
| | 107387152 | 78.39 | 32.15 | 73.20 | 47.77 | 80.88 | 58.21 | 54 |
| | 107387989 | 70.66 | 27.98 | 70.61 | 48.85 | 79.40 | 70.45 | 54 |
| | 107388489 | 66.77 | 25.35 | 80.93 | 52.23 | 74.30 | 70.42 | 57 |
| | 107387830 | 80.90 | 42.53 | 67.98 | 54.08 | 72.96 | 73.81 | 58 |
| | 107388083 | 80.93 | 25.34 | 73.19 | 48.85 | 80.88 | 58.21 | 58 |
| | 107387587 | 78.39 | 34.72 | 70.61 | 45.15 | 80.75 | 67.09 | 59 |
| | 107388200 | 78.29 | 20.14 | 77.06 | 45.69 | 73.75 | 60.01 | 59 |
| | 107388105 | 78.30 | 58.20 | 70.34 | 79.02 | 80.59 | 77.57 | 67 |
| | 107387953 | 56.07 | 67.22 | 73.18 | 43.09 | 70.48 | 67.06 | 70 |
| | 107387882 | 62.78 | 20.13 | 67.90 | 43.83 | 80.32 | 85.87 | 74 |
| | 107388500 | 62.76 | 21.61 | 66.65 | 34.48 | 75.87 | 22.74 | 86 |
| 662 → | 107388185 | 62.62 | 40.98 | 70.66 | 27.98 | 0.00 | 0.00 | 143 |
| 664 → | 107388224 | 75.84 | 29.49 | 0.00 | 0.00 | 0.00 | 0.00 | 203 |
| 666 → | 107387094 | 75.76 | 20.14 | 0.00 | 0.00 | 0.00 | 0.00 | 208 |
| 668 → | 107388450 | 80.64 | 73.10 | 0.00 | 0.00 | 0.00 | 0.00 | 226 |
| 670 | | | | | | | | |

682 brackets rows 2–4

FIG. 10

ORDER GROUPING IN WAREHOUSE ORDER FULFILLMENT OPERATIONS

FIELD OF THE INVENTION

This invention relates to grouping of orders in an order queue of a warehouse management system to improve order execution efficiency using autonomous mobile robots, human operators, or a combination thereof.

BACKGROUND OF THE INVENTION

Order fulfillment is typically performed in a large warehouse filled with products to be shipped to customers who have placed their orders over the internet for home delivery. In some operations, humans may manually fulfill orders by traversing the warehouse to retrieve the items in the orders. In other operations, robots may be used to perform the item retrieval functions in place of humans, or robots may be used to assist humans in item retrieval in both cases in order to increase productivity and efficiency.

Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

A warehouse management system (WMS) is a software application that supports the day-to-day operations in an order fulfillment warehouse like the one described above, which may utilize humans and/or robots to increase efficiency and productivity of the operation. WMS programs enable centralized management of tasks, such as tracking inventory levels and stock locations. Warehouse management systems also support or direct all of the major and many minor warehouse tasks such as receiving, inspection and acceptance, put-away, internal replenishment to picking positions, picking, packing, order assembly on the shipping dock, documentation, and shipping (loading onto carrier vehicles).

The WMS typically receives orders from the overlying host system, usually an ERP system. For order fulfillment via. E-Commerce orders, as soon as a customer places an order online, the information is passed along via the host computer (an ERP system) to the WMS. All necessary steps to manage this order (e.g. pick the ordered items etc.) are then processed within the WMS. Afterwards information is sent back to the business host computer to support financial transactions, advance shipping notifications to customers, inventory management, etc.

As the orders from the WMS accrue they are held in an order queue and distributed to the humans or robots to execute the orders within the warehouse. The orders may be taken in sequence from the order queue in the order they arrived and assigned to humans and/or robots to execute the orders. The orders may also be arranged in the order queue and assigned according to service level requirements defined in the customer contracts or based on customer shipping requirements. While these systems have become quite sophisticated, there still exists a need to improve efficiency and productivity in the order queuing and assignment process.

BRIEF SUMMARY OF THE INVENTION

The benefits and advantages of the present invention over existing systems will be readily apparent from the Brief Summary of the Invention and Detailed Description to follow. One skilled in the art will appreciate that the present teachings can be practiced with embodiments other than those summarized or disclosed below.

In one aspect, the invention includes a method for grouping a plurality of orders in an order queue of a warehouse management system, each order including one or more items and each item being associated with a physical location in a warehouse. The method includes determining a physical location in the warehouse of each item in the plurality of orders. For each order, the method also includes establishing at least one cluster region, each cluster region including at least one item from the respective order and grouping the plurality of orders based on the physical locations of the cluster regions in the warehouse to form at least one order set.

In other aspects of the invention, one or more of the following features may be included. Determining the physical location in the warehouse of each of the items in the plurality of orders may include determining the two dimensional coordinates (x, y) of each of the items in the plurality of orders in a coordinate space defined by the warehouse. The step of determining may include retrieving the two dimensional coordinates (x, y) for each item from a data structure containing the two dimensional coordinates (x, y) of a fiducial marker associated with each said item. The step of establishing may include, for each item in each of the plurality of orders, determining if the two dimensional coordinates (x, y) are contained within an already established cluster region for the order and, if they are, assigning each such item to the respective cluster region for the order; and, if they are not contained within an already established cluster region, establishing a new cluster region about the two dimensional coordinates (x, y) for each such item in the respective order. The step of establishing the new cluster region about the two dimensional coordinates (x, y) for each such item may include forming a circle having a radius, R, about the two dimensional coordinates (x, y) for each such item not contained within an already established cluster region to define the new cluster region for the respective order. The step of grouping may include calculating for each order a location for each cluster region and comparing the location of each cluster region in an order to the location of a corresponding cluster region from at least one other of the plurality of orders. The location of each cluster region in each of the plurality of orders may be determined by calculating an average of the two dimensional coordinates (x, y) of each item in the respective cluster region to obtain a midpoint location for each of the cluster regions. The step of grouping may further include establishing a base order and comparing the midpoint of each cluster region in the base order to the midpoint of the corresponding cluster region in each of the other of the plurality of orders to determine the physical location of each cluster region in the base order relative to physical location of the corresponding cluster region in each of the other of the plurality of orders.

In other aspects of the invention, one or more of the following features may be included. The step of comparing the midpoint of each cluster region in the base order to the midpoint of the corresponding cluster region in each of the other of the plurality of orders may include calculating the distance between the midpoint of each cluster region in the base order to the midpoint of the corresponding cluster region in each of the other of the plurality of orders and summing each calculated distance to determine an aggregate distance between the midpoint of each cluster region in the base order to the midpoint of the corresponding cluster region in each of the other of the plurality of orders. The step of grouping may further include combining with the base order at least one other order based on the lowest aggregate distance between the midpoint of each cluster region in the base order to the midpoint of the corresponding cluster region in the at least one other order to form the at least one order set. including assigning to one of a human operator or an autonomous mobile robot the at least one order set. The human operator and the autonomous mobile robot may have an order capacity and the number of orders combined to form the at least one order set may be based on the capacity of the human operator and the autonomous mobile robot. The step of assigning to one of a human operator or an autonomous mobile robot may include electronically transmitting the order sets to one of a handheld electronic device for the human operator or an onboard electronic device for the autonomous mobile robot. The orders may include pick orders, place orders or maintenance orders. There may be a maximum number of cluster regions that can be established for each of the orders. The step of establishing at least one cluster region for each order may include correlating each cluster region to one of a plurality of regions arranged in a sequence in the warehouse. The maximum number of cluster regions may correspond to the number of regions in the warehouse, and wherein the step of establishing at least one cluster region for each order may include selecting the items from each order for establishing the cluster regions in a sequence based on the sequence of the plurality of regions in the warehouse.

In another aspect, the invention includes a warehouse order system for grouping a plurality of orders in an order queue. The system comprises a memory including a plurality of orders in an order queue, each order including one or more items and each item being associated with a physical location in a warehouse. The system also includes a processor configured to determine a physical location in the warehouse of each item in the plurality of orders and for each order, establish at least one cluster region, each cluster region including at least one item from the respective order. The processor is also configured to group the plurality of orders based on the physical locations of the cluster regions in the warehouse to form at least one order set.

In additional aspects of the invention, one or more of the following features may be included. The processor may further be configured to determine the two dimensional coordinates (x, y) of each of the items in the plurality of orders in a coordinate space defined by the warehouse. The processor may further be configured to retrieve the two dimensional coordinates (x, y) for each item from a data structure containing the two dimensional coordinates (x, y) of a fiducial marker associated with each said item. The processor may further be configured to, for each item in each of the plurality of orders, determine if the two dimensional coordinates (x, y) are contained within an already established cluster region for the order and, if they are, to assign each such item to the respective cluster region for the order; and, if they are not contained within an already established cluster region, to establish a new cluster region about the two dimensional coordinates (x, y) for each such item in the respective order. The processor may further be configured to form a circle having a radius, R, about the two dimensional coordinates (x, y) for each such item not contained within an already established cluster region to define the new cluster region for the respective order. The processor may further be configured to calculate for each order a location for each cluster region and to compare the location of each cluster region in an order to the location of a corresponding cluster region from at least one other of the plurality of orders. The processor may further be configured to calculate an average of the two dimensional coordinates (x, y) of each item in the respective cluster region to obtain a midpoint location for each of the cluster regions. The processor may further be configured to establish a base order and to compare the midpoint of each cluster region in the base order to the midpoint of the corresponding cluster region in each of the other of the plurality of orders to determine the physical location of each cluster region in the base order relative to physical location of the corresponding cluster region in each of the other of the plurality of orders.

In yet further aspects of the invention, one or more of the following features may be included. The processor may further be configured to calculate the distance between the midpoint of each cluster region in the base order to the midpoint of the corresponding cluster region in each of the other of the plurality of orders and to sum each calculated distance to determine an aggregate distance between the midpoint of each cluster region in the base order to the midpoint of the corresponding cluster region in each of the other of the plurality of orders. The processor may further be configured to combine with the base order at least one other order based on the lowest aggregate distance between the midpoint of each cluster region in the base order to the midpoint of the corresponding cluster region in the at least one other order to form the at least one order set. The processor may further be configured to assign to one of a human operator or an autonomous mobile robot the at least one order set. The human operator and the autonomous mobile robot may have an order capacity and the number of orders may be combined to form the at least one order set is based on the capacity of the human operator and the autonomous mobile robot. 30. The processor may further be configured to the electronically transmit the order sets to one of a handheld electronic device for the human operator or an onboard electronic device for the autonomous mobile robot. The orders may include pick orders, place orders or maintenance orders. There may be a maximum number of cluster regions that can be established for each of the orders. The processor may further be configured to correlate each cluster region to one of a plurality of regions arranged in a sequence in the warehouse. The maximum number of cluster regions may correspond to the number of regions in the warehouse, and the processor may further be configured to select the items from each order for establishing the cluster regions in a sequence based on the sequence of the plurality of regions in the warehouse.

These and other features of the invention will be apparent from the following detailed description and the accompanying figures.

BRIEF DESCRIPTION OF THE FIGURES

Embodiments of the present invention will now be described, by way of example only, with reference to the attached Figures, wherein:

FIG. 6 is a table of the fiducial identification to pose mapping;

FIG. 7 is a table of the bin location to fiducial identification mapping;

FIG. 10 is a table depicting a portion of an order queue according to an aspect of this invention;

DETAILED DESCRIPTION OF THE INVENTION

Figure 1:
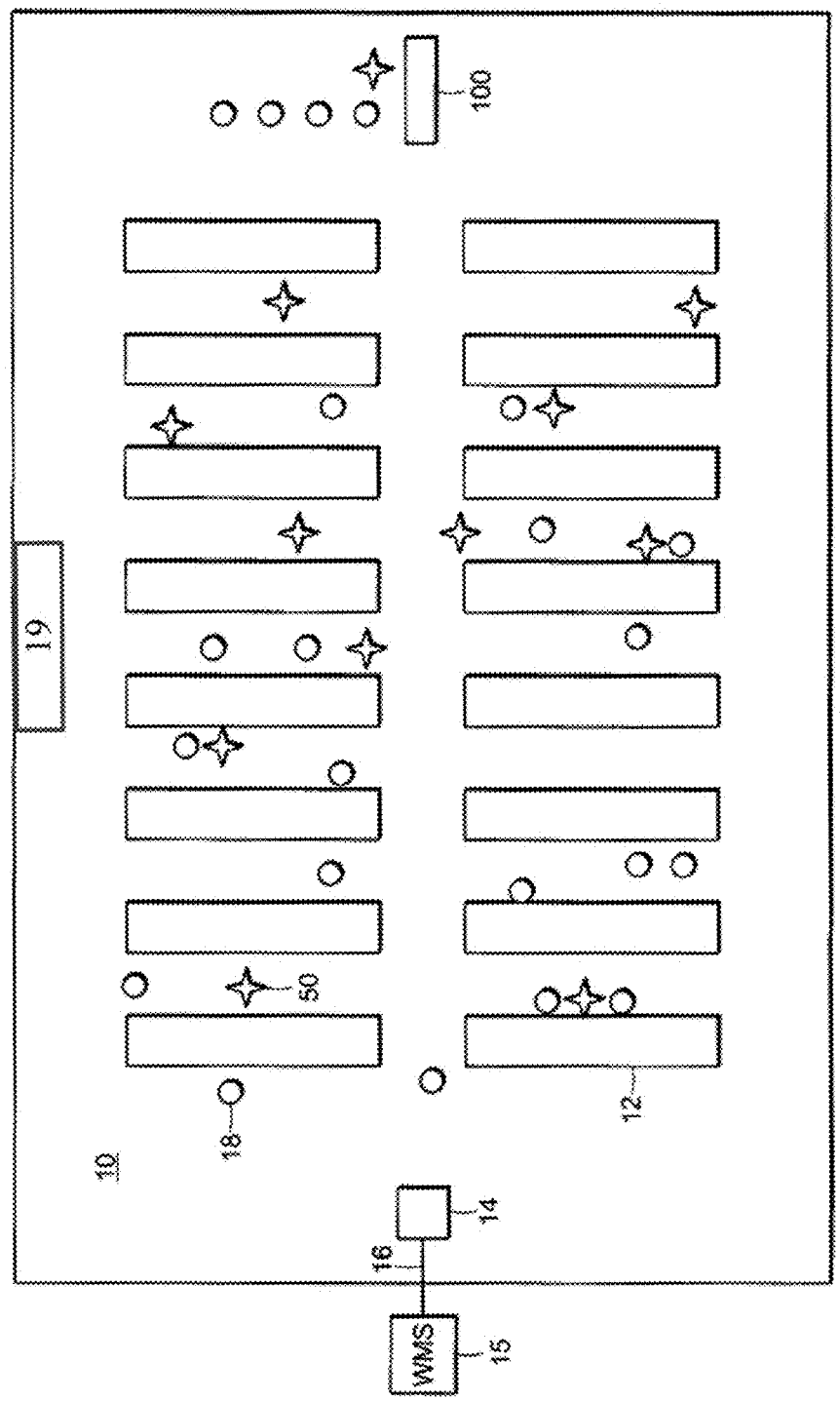
FIG. 1 is a top plan view of an order-fulfillment warehouse.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The disclosure is directed to an order grouping process which may be applied to an order fulfillment operation in a warehouse using autonomous mobile robots or "AMRs" in order to increase efficiency and productivity. The use of robots in this application will be described to provide context for the order grouping process. In the application described, the robots are assisted by human operators to more efficiently perform the picking and placing of items, but the disclosure is equally applicable to robots having articulated arms to perform the picking and placing operations. It should also be noted that the order grouping process according to this disclosure may be used in an order fulfillment operation in a warehouse where human operators perform the order fulfillment operations without the assistance of AMRs. In addition, the order grouping process according to this disclosure may be more generally applied to other applications using AMRs, human operators, or a combination of the two.

While the description provided herein is focused on picking items from bin locations in the warehouse to fulfill an order for shipment to a customer, the system is equally applicable to the storage or placing of items received into the warehouse in bin locations throughout the warehouse for later retrieval and shipment to a customer. The invention is also applicable to inventory control tasks associated with such a warehouse system, such as, consolidation, counting, verification, inspection and clean-up of products.

Referring to FIG. 1, a typical order-fulfillment warehouse 10 includes shelves 12 filled with the various items that could be included in an order 16. In operation, the order 16 from warehouse management server 15 arrives at an order-server 14. The order-server 14 communicates an order or group of orders (an order set) 16 to a robot 18 (which may be an autonomous mobile robot) selected from a plurality of robots that roam the warehouse 10. It should be noted that the functionality of the order-server 14 may be integrated with the functionality of the warehouse management server 15 into a single server. Also shown is charging area 19, which is where one or more charging stations may be located. The operation of robot 18 executing an order/order set will first be described herein. Then, a process according to an aspect of this disclosure for grouping orders into order sets by order server 14 and/or warehouse management server 15 and assigning the order sets to robots, in order to increase efficiency and productivity, will be described.

Figure 2A:
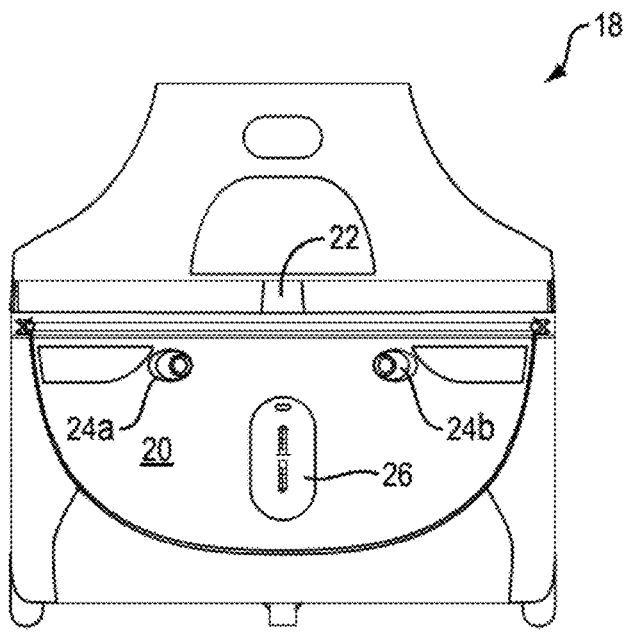
FIG. 2A is a front elevational view of a base of one of the robots used in the warehouse shown in FIG. 1.
Figure 2B:
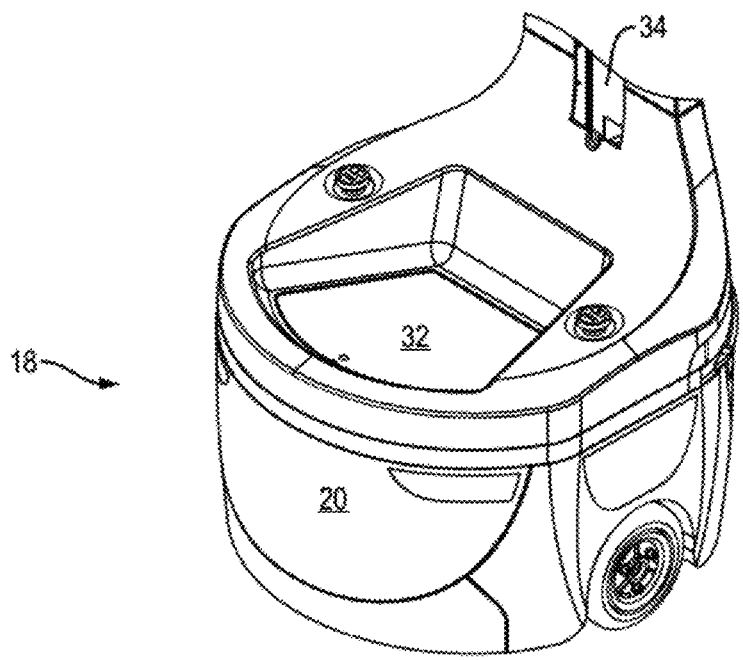
FIG. 2B is a perspective view of a base of one of the robots used in the warehouse shown in FIG. 1.
Figure 3:
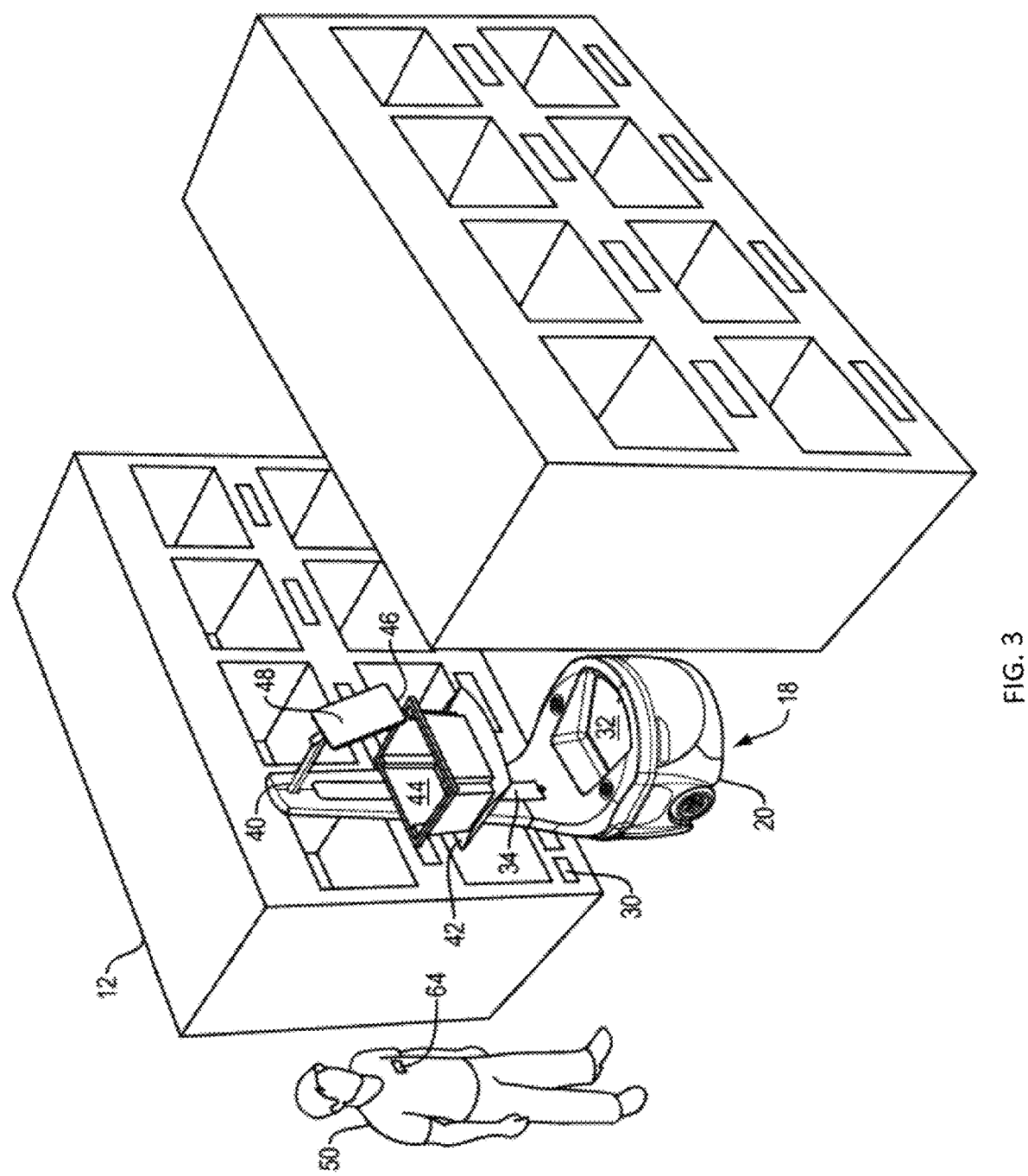
FIG. 3 is a perspective view of the robot in FIGS. 2A and 2B outfitted with an armature and parked in front of a shelf shown in FIG. 1.
Figure 11:
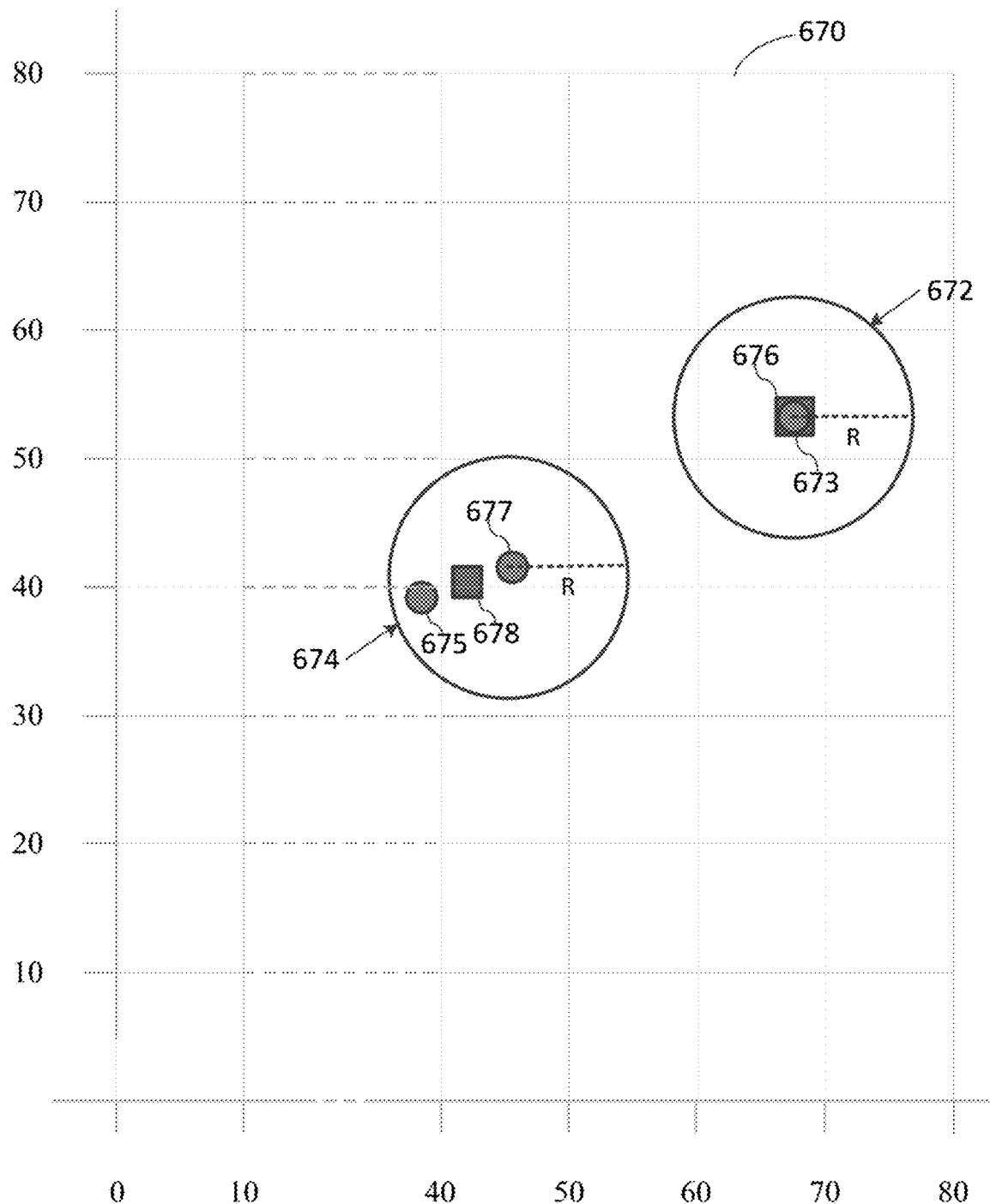
FIG. 11 is a plan view of a portion of warehouse the warehouse of FIG. 9 depicting the midpoints of cluster regions according to an aspect of this invention are determined.
Figure 12:
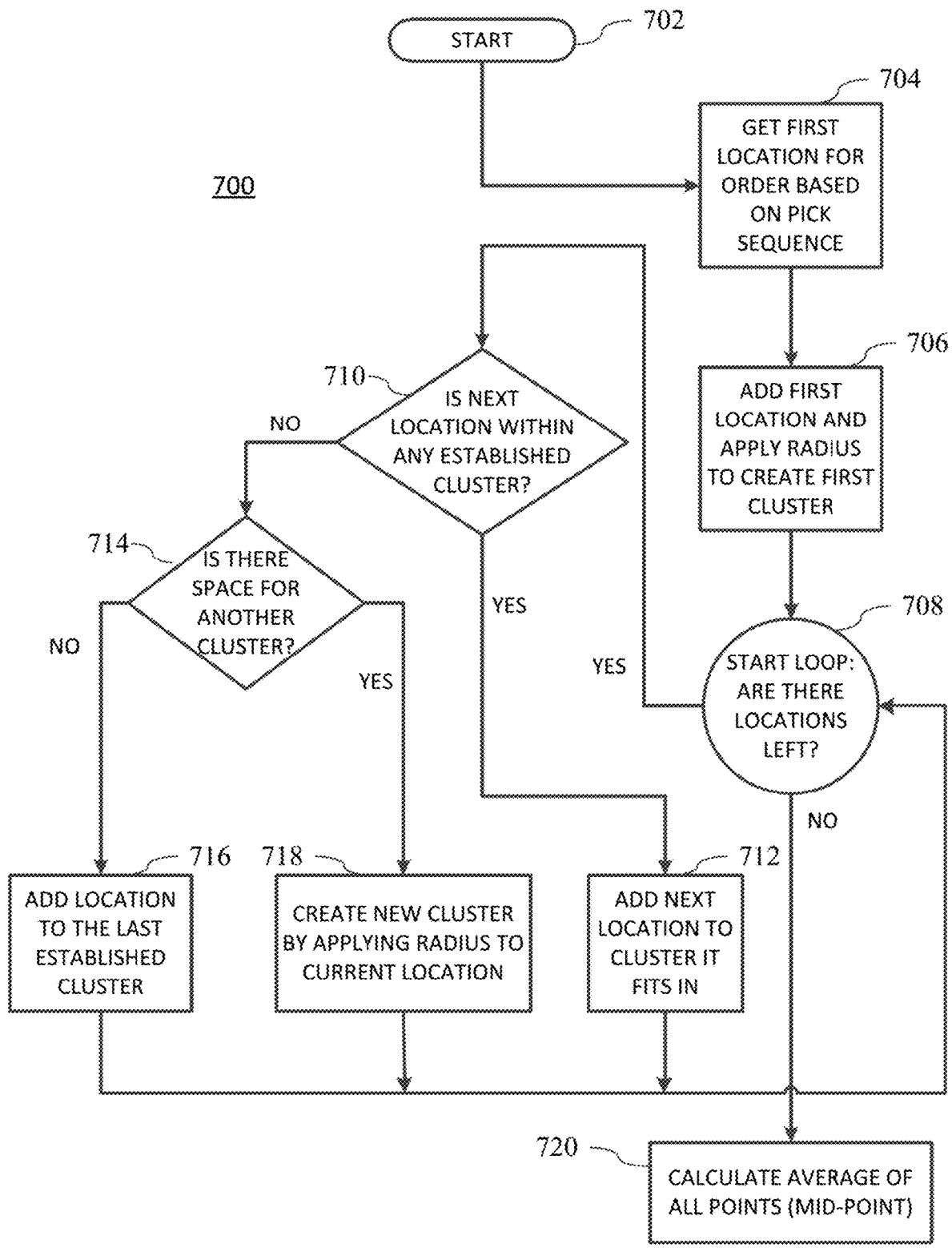
FIG. 12 is a flow chart describing the process of establishing cluster regions according to an aspect of this invention.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from the order-server 14, and a pair of digital optical cameras 24*a* and 24*b*. The robot base also includes an electrical charging port 26 (depicted in more detail in FIGS. 10 and 11) for re-charging the batteries which power autonomous wheeled base 20. The base 20 further features a processor (not shown) that receives data from the laser-radar and cameras 24*a* and 24*b* to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8. Fiducial markers are also used to identify charging stations and the navigation to such charging station fiducial markers is the same as the navigation to the bin/location of items ordered. Once the robots navigate to a charging station, a more precise navigation approach is used to dock the robot with the charging station and such a navigation approach is described below.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, robot articulated arms are not yet optimized for quickly and efficiently picking items from a shelf and placing them in the tote 44. Currently, a more efficient way of picking items is to use a local operator 50, which is typically human, to carry out the task of physically removing an ordered item from a shelf 12 and placing it on robot 18, for example, in tote 44. The robot 18 communicates the item needed to the local operator 50 via the tablet 48 (or laptop/other user input device), which the local operator 50 can read, or by transmitting the order to a handheld device used by the local operator 50. The order grouping disclosure described herein is equally applicable to robots having articulated arms to perform the picking and placing operations as the technology advances.

Upon receiving an order/order set 16 from the order server 14, the robot 18 proceeds to a first warehouse location, e.g. as shown in FIG. 3, to execute the function (e.g. pick/place) for the first item in the order/order set. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location, the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a packing station 100, FIG. 1, where they are packed and shipped.

It will be understood by those skilled in the art that each robot may be fulfilling one or more orders and each order may consist of one or more items when the robots have sufficient capacity and the proper tote configuration. A process for grouping orders into order sets for assignment to individual robots may improve operational efficiency and overall productivity will be described below in more detail.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-8. As noted above, the same navigation approach may be used to enable the robot to navigate to a charging station in order to recharge its battery.

Using one or more robots 18, a map of the warehouse 10 must be created and dynamically updated to determine the location of objects, both static and dynamic, as well as the locations of various fiducial markers dispersed throughout the warehouse. One or more of the robots 18 navigate the warehouse and build/update a map 10a, FIG. 4, utilizing its laser-radar 22 and simultaneous localization and mapping (SLAM), which is a computational method of constructing or updating a virtual map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create/update map 10a of warehouse 10 as robot 18 travels throughout the space identifying open space 112, walls 114, objects 116, and other static obstacles such as shelves 12a in the space, based on the reflections it receives as the laser-radar scans the environment.

Figure 4:
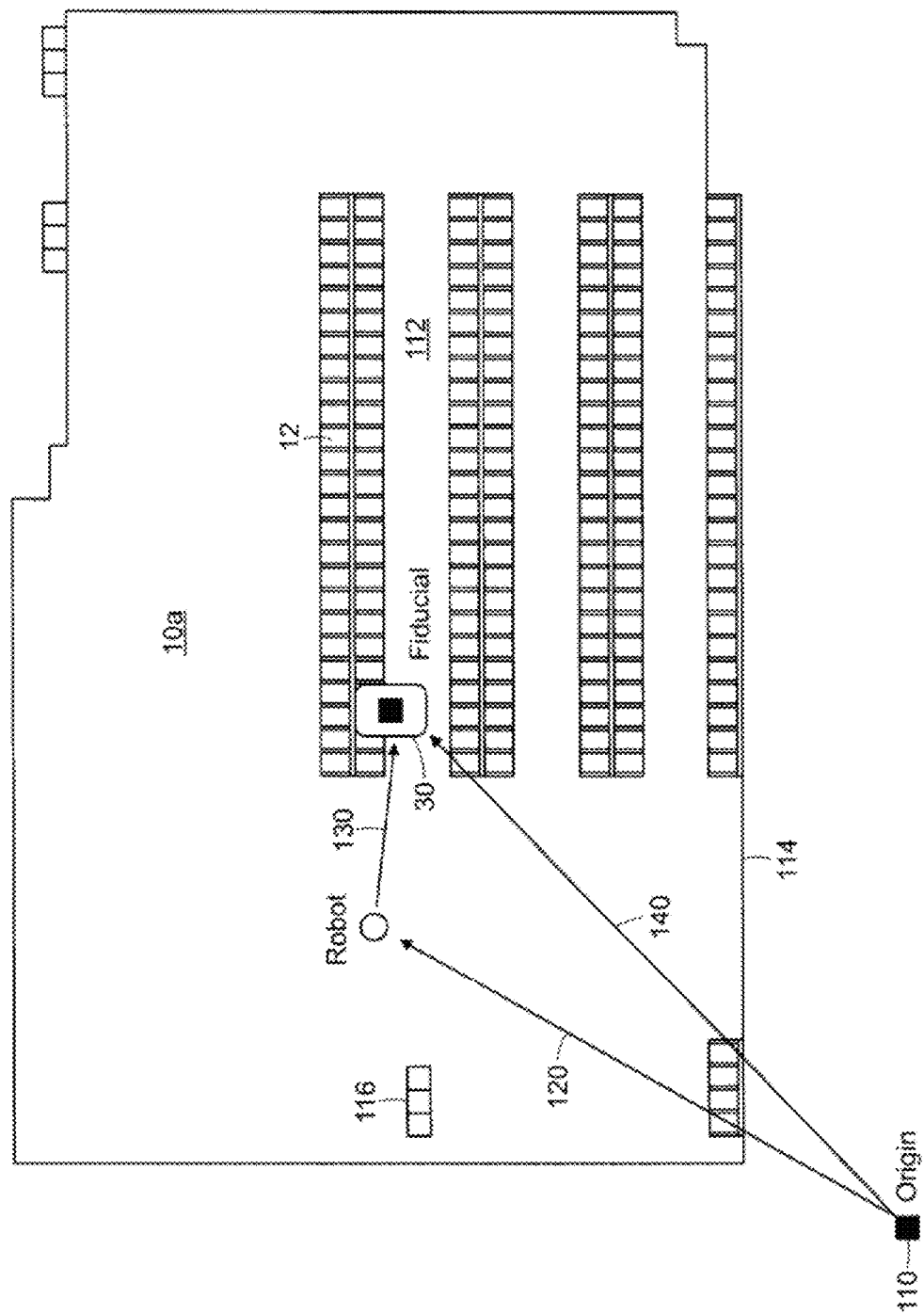
FIG. 4 is a partial map of the warehouse of FIG. 1 created using laser radar on the robot.

While constructing the map 10a or thereafter, one or more robots 18 navigates through warehouse 10 using cameras 24a and 24b to scan the environment to locate fiducial markers (two-dimensional bar codes) dispersed throughout the warehouse on shelves proximate bins, such as 32 and 34, FIG. 3, in which items are stored. Robots 18 use a known reference point or origin for reference, such as origin 110. When a fiducial marker, such as fiducial marker 30, FIGS. 3 and 4, is located by robot 18 using its cameras 24a and 24b, the location in the warehouse relative to origin 110 is determined. By using two cameras, one on either side of robot base, as shown in FIG. 2A, the robot 18 can have a relatively wide field of view (e.g. 120 degrees) extending out from both sides of the robot. This enables the robot to see, for example, fiducial markers on both sides of it as it travels up and down aisles of shelving.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose, which comprises its position (x, y, z coordinates) in the warehouse along with its orientation or quaternion (x, y, z, ω) for fiducial marker 30 can be determined. It should be noted that the coordinates may only include x and y coordinates as the fiducial pose is typically located on the floor and thus the z coordinate is zero.

Figure 5:
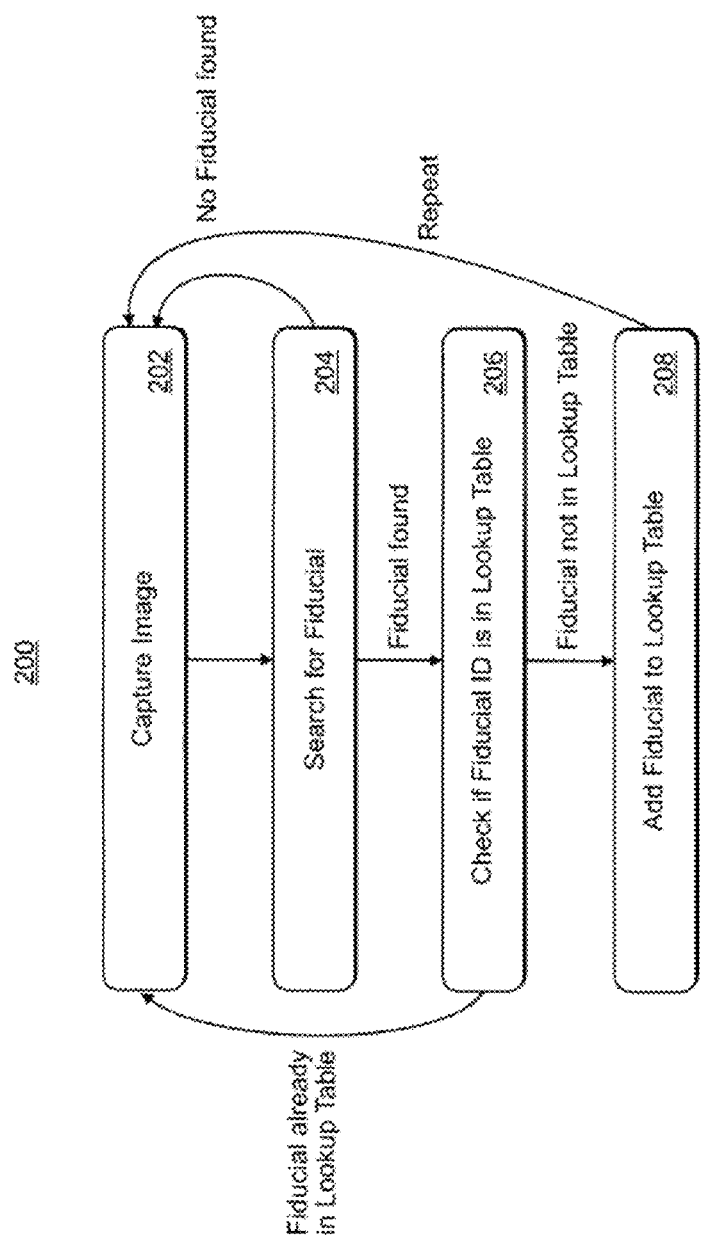
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using cameras 24a and 24b captures an image and in step 204 searches for fiducial markers within the captured images. In step 206, if a fiducial marker is found in the image (step 204) it is determined if the fiducial marker is already stored in fiducial table 300, FIG. 6, which may be located in memory 34 of robot 18 and/or in the warehouse management system 15. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot and/or in the warehouse management system 15, there are included for each fiducial marker, a fiducial identification, 1, 2, 3, etc., and a pose for the fiducial marker/bar code associated with each fiducial identification. As indicated above, the pose consists of the x,y,z coordinates in the warehouse along with the orientation or the quaternion (x,y,z, ω).

In another look-up Table 400, FIG. 7, which may also be stored in the memory of each robot and/or in the warehouse management system 15, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker. Charging stations located in charging area 19, FIG. 1, may also be stored in table 400 and correlated to fiducial IDs. From the fiducial IDs, the pose of the charging station may be found in table 300, FIG. 6.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, robot 18 can determine the pose of the fiducial ID using the information in table 300, FIG. 6, and then navigate to the pose as described herein.

Figure 8:
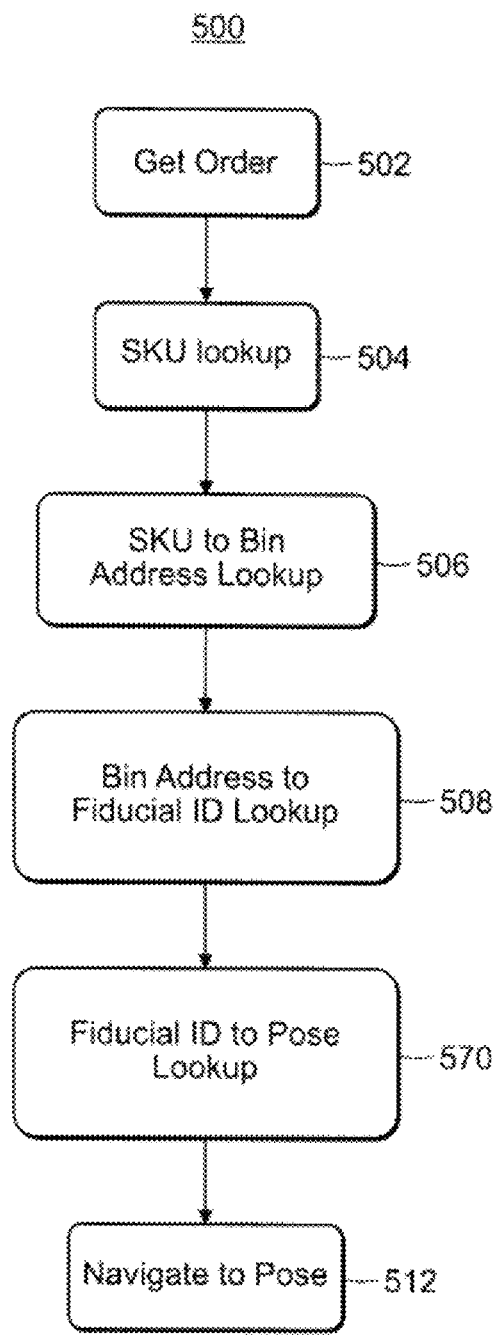
FIG. 8 is a flow chart depicting product SKU to pose mapping process.

The order fulfillment process according to this invention is depicted in flow chart 500, FIG. 8. In step 502, warehouse management system 15, FIG. 1, obtains an order, which may consist of one or more items to be retrieved. In step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial s known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 22, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

Generally, localization of the robot within warehouse 10a is achieved by many-to-many multiresolution scan matching (M3RSM) operating on the SLAM virtual map. Compared to brute force methods, M3RSM dramatically reduces the computational time for a robot to perform SLAM loop closure and scan matching, two critical steps in determining robot pose and position. Robot localization is further improved by minimizing the M3SRM search space according to methods disclosed in related U.S. application Ser. No. 15/712,222, entitled Multi-Resolution Scan Matching with Exclusion Zones, filed on Sep. 22, 2017 and incorporated by reference in its entirety herein.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Generally, navigation in the presence of other robots and moving obstacles in the warehouse is achieved by collision avoidance methods including the dynamic window approach (DWA) and optimal reciprocal collision avoidance (ORCA). DWA computes among feasible robot motion trajectories an incremental movement that avoids collisions with obstacles and favors the desired path to the target fiducial marker. ORCA optimally avoids collisions with other moving robots without requiring communication with the other robot(s). Navigation proceeds as a series of incremental movements along trajectories computed at the approximately 50 ms update intervals. Collision avoidance may be further improved by techniques described in related U.S. application Ser. No. 15/712,256, entitled Dynamic Window Approach Using Optimal Reciprocal Collision Avoidance Cost-Critic, filed on Sep. 22, 2017 and incorporated by reference in its entirety herein.

As noted above, a process for grouping orders (each order containing one or more items) into order sets for assignment to individual robots may improve operational efficiency and overall productivity will be described below in more detail with respect to FIGS. 9-17. Robots may have tote arrays which allow a single robot to execute multiple orders, one per bin or compartment. Examples of such tote arrays, described in U.S. patent application Ser. No. 15/254,321, filed on Sep. 1, 2016, which is incorporated herein in its entirety, provide an opportunity to cluster or group "like" orders together to reduce the amount of travel required for the robot to execute an order set. Orders may be determined to be "like" each other if, for example, the individual items or "picks" of one order are located near each other within the warehouse. In grouping like orders for assignment to a robot, the robot will travel less distance to fulfill the orders and therefore increase pick rates and overall efficiency/productivity of the warehouse operation.

Typical warehouse management systems do not contain information about the physical locations in the warehouse of the items stored therein. As described above, the system according to an aspect of this invention, has knowledge of the locations (x, y coordinates) of all of the items stored within the warehouse. With this information, it is possible to group orders based on their locations within the warehouse.

Figure 9:
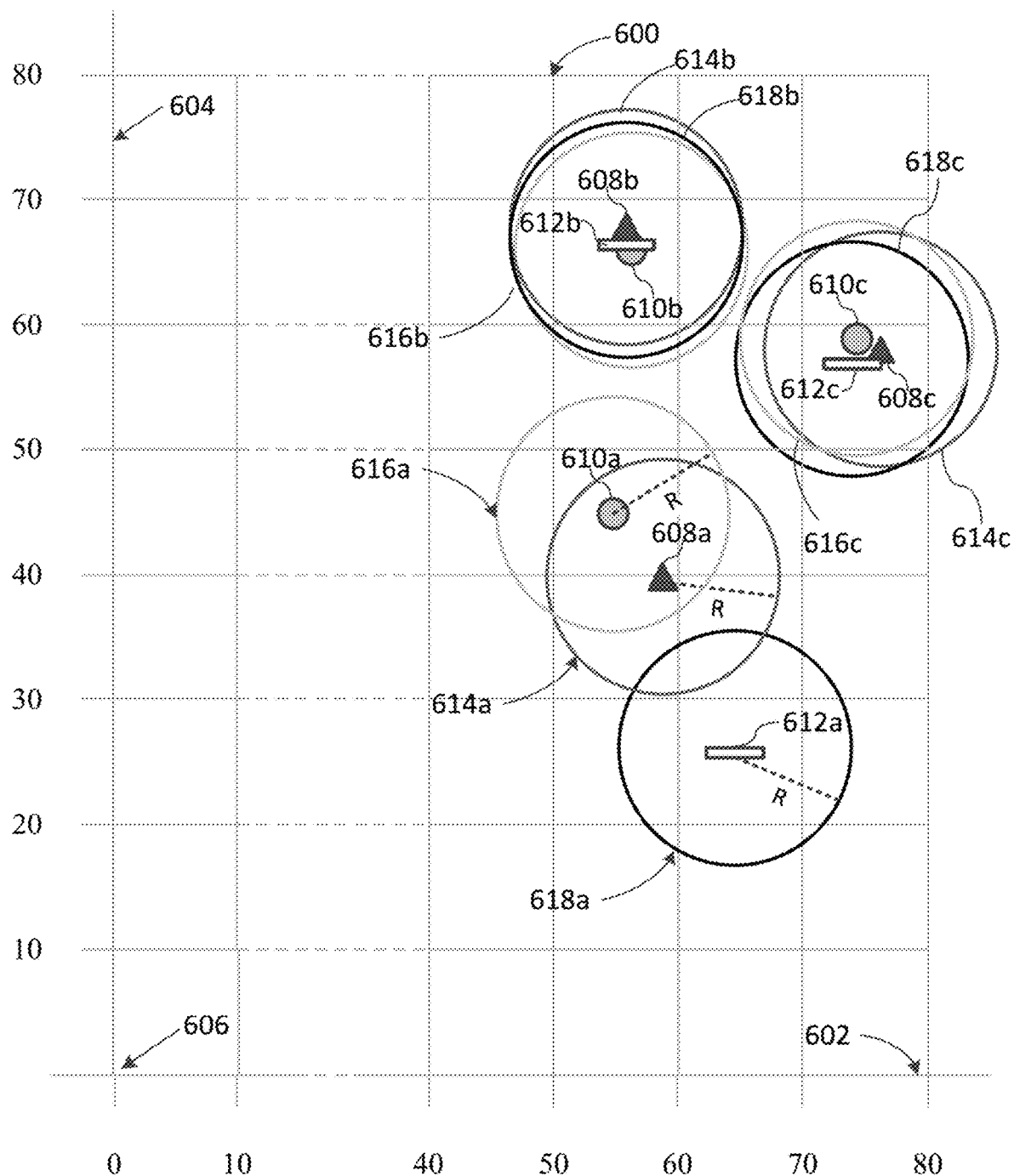
FIG. 9 is a plan view of a warehouse depicting the establishment of cluster regions according to an aspect of this invention.

A representation of a warehouse 600, FIG. 9, is depicted with a coordinate graph having x, y axes 602 and 604, respectively. In this example, both the x and y axes extend from a point of origin 606 (coordinates 0, 0) a length 80 meters. Various shapes and warehouse configurations may be utilized as long as the space is divided into coordinate system allowing the item locations in the warehouse to be mapped. Plotted on this graph are item locations from three orders, which are designated by "circles", "triangles", and "dashes", respectively. This, of course, is a simplified example to more easily illustrate the process of order grouping according to this invention. Moreover, for ease of understanding, no shelving units or other objects which would normally be present are shown in this view.

Referring to FIG. 10, there is shown a portion of order queue 650 from the warehouse management system, which includes all of the current orders (listed in column 652) queued for assignment to a robot for execution. The orders may be sorted/arranged in various ways including, for example, by service level agreement and/or delivery requirements. The order set grouping aspect of this invention is independent of how the orders are sorted and prioritized; once the orders are appropriately queued, the process herein is used to group the orders into order sets for assignment. While the preferred embodiment herein is described using robots to execute the orders, the invention is equally applicable to warehouse order fulfillment operations using humans to pick the orders. In the case where humans are used to pick the orders, the orders grouped into order sets may be transmitted by the warehouse management system to a handheld computing or electronic device which may be held or worn by the human or which may be located on a cart which the human would use to carry the items.

Continuing to refer to FIG. 10, for each order in column 652 there are three sets of columns 654, 656, and 658, which include coordinates $(x_1,y_1)$, $(x_2,y_2)$, and $(x_3,y_3)$. These coordinates correspond to the midpoints of cluster regions, which cluster regions are shown on warehouse coordinate graph 600, FIG. 9. The cluster regions are formed by plotting the locations of items on the coordinate graph and grouping them into clusters of one or more items that are close in proximity to each other. The specific process of grouping items within orders into cluster regions will be described in more detail with regard to the flow chart of FIG. 13.

First a simplified example, as shown in FIG. 9, is provided to describe the cluster regions generally. The first three orders, namely, order nos. 107387396, 107387878, and 107388221, set forth in queue 650, FIG. 10, are the only orders which are plotted on warehouse 600 coordinate graph in FIG. 9. Moreover, in this simplified example there are only three items per order. In a typical warehouse system, there would be many more orders plotted and each order will have one or multiple items.

The items in the first order (107387396) are plotted in FIG. 9 as triangles 608a, 608b and 608c, which are at coordinates $(x_1=57.56, y_1=37.23)$, $(x_2=57.38, y_2=68.52)$, and $(x_3=73.9, y_3=57.88)$, respectively. The items in the second order (107387878) are plotted as circles 610a, 610b and 610c, which are at coordinates $(x_1=54.83, y_1=45.06)$, $(x_2=57.36, y_2=66.47)$, and $(x_3=73.44, y_3=58.20)$, respectively. The items in the third order (107388221) are plotted as dashes 612a, 612b and 612c, which are at coordinates $(x_1=65.31, y_1=25.35)$, $(x_2=57.38, y_2=68.52)$, and $(x_3=73.09, y_3=57.25)$, respectively. The coordinates of the items in the three orders correspond to the poses of the items, which poses are already known and stored in a data structure, such as table 300, FIG. 6. While not shown in FIG. 9 the items from remaining orders in the order queue 650 would also be plotted.

Continuing to refer to FIG. 9, one or more cluster regions is/are formed for each order. Cluster region 614a may be formed about triangle 608a, which represents the first item in first order (107387396). The region may be circular in shape with a radius, R, extending from the coordinates $(x_1=57.56, y_1=37.23)$ of triangle 608a. Cluster region 616a may be formed about circle 610a, which represents the first item in second order (107387878). The region may also be circular in shape with a radius, R, extending from the coordinates $(x_2=57.38, y_2=68.52)$ of circle 610a. Also, cluster region 618a may be formed about dash 612a, which represents the first item in third order (107388221). The region may also be circular in shape with a radius, R, extending from the coordinates $(x_3=73.09, y_3=57.25)$ of dash 612a.

Cluster regions 614b, 616b, and 618b are similarly formed about triangle 610b, circle 610b, and dash 612b, respectively, which correspond to the locations of the second items in the first, second and third orders. Likewise, cluster regions 614c, 616c, and 618c are similarly formed about triangle 610c, circle 610c, and dash 612c, respectively, which correspond to the locations of the third items in the first, second, and third orders. These cluster regions are also circular in shape and have a radius, R.

The size of the cluster regions and the number of cluster regions per order may be set according various factors including the size/configuration of the warehouse, spacing and size of shelf units, and the amount of order activity in the warehouse. In this example, the radius, R, of the cluster regions is set at ten meters and the maximum number of cluster regions per order is set at three. It should be noted that these are just exemplary settings for a particular application and they may be varied. In addition, the size and number of cluster regions may be dynamically changed by warehouse management system based on machine learning as conditions in the warehouse change over time.

As will be described below, the midpoints of the cluster regions are used to group orders together into order sets for assignment to robots. In this simple example, at least for the first three orders, since there is only one item per cluster region, the midpoint of the cluster regions is the location of the only item in the cluster region. Thus, the midpoints of the cluster regions for the first three orders are the coordinates for the only item in each cluster region and these locations are stored in the order queue 650, FIG. 10, as the (x, y) coordinates 654, 656, and 658 for the respective order.

In many cases there will be multiple items in an order which are grouped in a single cluster region. This is depicted, for example, in FIG. 11 where there is shown an image of warehouse 670 with two cluster regions 672 and 674. Cluster region 672 is like the cluster regions depicted in FIG. 9, in that it has only a single item/location 673 about which the radius, R, is applied to form the cluster region. The midpoint (square 676) of cluster region 672 coincides with location 673 and those coordinates of location 673 would be stored in the order queue for the particular order. In contrast, cluster region 674 includes two items/locations 675 and 677. This cluster region is formed about location 677 by applying radius, R. The midpoint of a multi-item cluster region may be determined by averaging the positions as follows:

$$x1+x2+\ldots xn/n,\ y1+y2+\ldots yn/n, \qquad (1)$$

where n is the number of items in the cluster region. In cluster region 674 the midpoint is depicted as square 678, which is located between the two items/locations 675 and 677. The coordinates of the square 678 would be saved as the in the order queue (e.g. 650) as the x, y coordinates for cluster region 674 for a particular order.

Figure 13:
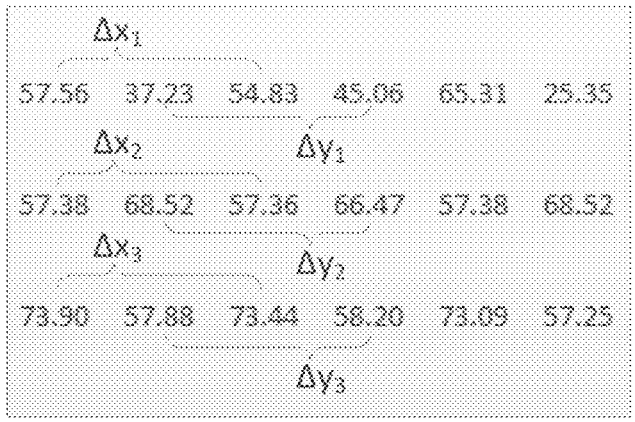
FIG. 13 shows the midpoint coordinates for the cluster regions of orders 1-3 in a different configuration than the table of FIG. 10.

The process for establishing the cluster regions is depicted in flow chart 700, FIG. 13. At step 702, the process begins to assess the first order in the order queue. At step 704, the x, y coordinates of the first item (which may be based on a specific pick sequence) in the first order in the queue are obtained and the item is plotted on the image of the warehouse. The order of selection of items from the order (pick sequence) may be a factor in establishing effective cluster regions. This is described below with regard to FIGS. 15 and 16. In the example described above, the first item in the first order would be the item having location 608a, FIG. 9, which is retrieved from the data structure containing the pose of the fiducial ID/marker associated with the SKU for such first item. Next, at step 706 a first cluster region (e.g. cluster region 614a) is established about the first item. As described above, the cluster region may be established by creating a circular region about the location of the first item having a predetermined radius, R. While the cluster regions described herein are circular in shape, they may take different shapes/forms such as square or rectangular or another suitable shape.

The system proceeds to step 708, where the evaluation of the remaining items in the first order is undertaken. At step 710, the location of the next item in the order is retrieved and assessed to see if it is positioned within the first established cluster region (region 614a). If the location is within the space defined by the first established cluster region, the system proceeds to step 712 and adds the location of the item to the cluster region within which it is located. If, alternatively, it is determined that the next location is not contained within any existing cluster region, as is the case with location 608b, FIG. 9, the system proceeds to step 714. At step 714, it is determined if there is space to establish a new cluster region. This is done by assessing the maximum defined number of cluster regions available. If, at step 714, it is determined that there is not room for a new cluster region, then the current item is added to the last established cluster region in step 716.

If, alternatively, in step 714 it is determined that there is room for a new cluster region, at step 718, a new cluster is created by applying the predetermined radius, R, to the location of the current item. In the example described with respect to FIG. 9, the maximum number of cluster regions per order is three. Since the maximum number of cluster regions has not been reached, the location of the next item 608b in the first order is used to form cluster region 614b.

After steps 712, 716 or 718 the system loops back to step 708 to assess whether there are other items remaining in the current order to evaluate. If there are, the location of the next item is evaluated at step 710 et seq., as described above. With the example described in FIG. 9, the location of item 608c is determined to not be in cluster region 614a or 614b. Since the maximum number of cluster regions for an order (three) has not yet been reached, a third cluster region about location 614c is formed about location 608c.

If at step 708 it is determined that there are no further items in that order to assess, the system proceeds to step 720 (as is the case of order one after items 608a-608c have been assessed) wherein the midpoint or average location of all locations in each cluster for the current is determined. The midpoint for each cluster in the current order is then stored in the order queue 650, FIG. 10, as the (x, y) coordinates in column sets 654, 656, and 658. The system continues to run process 700 for each order in the order queue and populate the x, y coordinates for the midpoint for each order in the queue, as described above.

Referring to FIG. 10 again, order 1, identified by reference number 660, through order 20, identified by reference number 662, have non-zero coordinates in each of column sets 654, 656 and 658, each corresponding to one of the three cluster regions (maximum number allowed per order). Order 21, designated by reference number 664, has non-zero coordinates in columns sets 654 and 656, but not column set 658, which has x, y coordinates of 0,0. This indicates that for order 21, there are only two cluster regions; namely, cluster regions one and two and not a third cluster region in which the items for the order are grouped. For orders 22-24, designated by reference numbers 666, 668, and 670, respectively, they have non-zero coordinates only in column set 654 and not in columns sets 656 and 658, which have x, y coordinates of 0,0. This indicates that for orders 22-24, there is only one cluster region; namely, cluster region one in which the items for the orders are grouped.

When there are no items in a particular cluster region, the system herein assigns the, x, y coordinates to be 0, 0, which is located at the origin of the graph of the warehouse. The coordinates for the case where there are no items in a possible cluster region, could be assigned different coordinates, as long as they are not coordinates where any item in inventory may be located.

Once the order queue is populated with midpoints for the cluster regions in each order, the system may then use the order queue to group "like" orders together and assign them for execution. The order at the top of the queue, which in the example of queue 650, FIG. 10, is order 660, may be designated as the base order and the other orders in the queue (or some portion of the queue) may be compared to the base order and scored. A process for scoring the orders according to an aspect of this invention will be described in detail below. The first order in the queue need not be designated as the base order but when the queue is ordered by priority, it is logical that the order at the top of the queue be processed first. Once like orders are grouped with the order at the top of the queue, the queue is reestablished by priority and the new item at the top of the queue may now be designated as the current base order to be grouped with like orders.

Column 680 in order queue 650 contains the score for each order relative the current base order, which in this example is the order designated by reference number 660. The base order is assigned a score of "0" and then the order queue is sorted in ascending order by score for each of the orders or portion thereof being compared to the base order for grouping with the base order for assignment. The scoring for the orders shown for base order 1, ranges from 11 to 226, which indicates how "like" the other orders are to the base order. Likeness may be defined as how close in proximity each order is to the base order (the lower the number the closer).

The base order may then be grouped with one or more other orders according to score. The base order may be grouped with a predefined, fixed number of orders, for example two, three, etc., and then assigned. Or, they may be grouped by the number of orders for which either the robot or human, as applicable, has capacity to transport. In the case of a robot with a carrier having three compartments, the base order would be grouped with two other orders, e.g. orders 2-3, for example, closest in proximity to it, forming order set 682, as shown in FIG. 10. Since the score represents proximity to the base order, the order set 682 for a robot capable of carrying three orders, will be optimized such that this grouping of orders will result in the least amount of travel and hence the greatest efficiency of order execution. This process may be just as easily utilized in a system where humans are assigned the order set to execute in order to minimize the amount of travel for the human.

Figure 14:
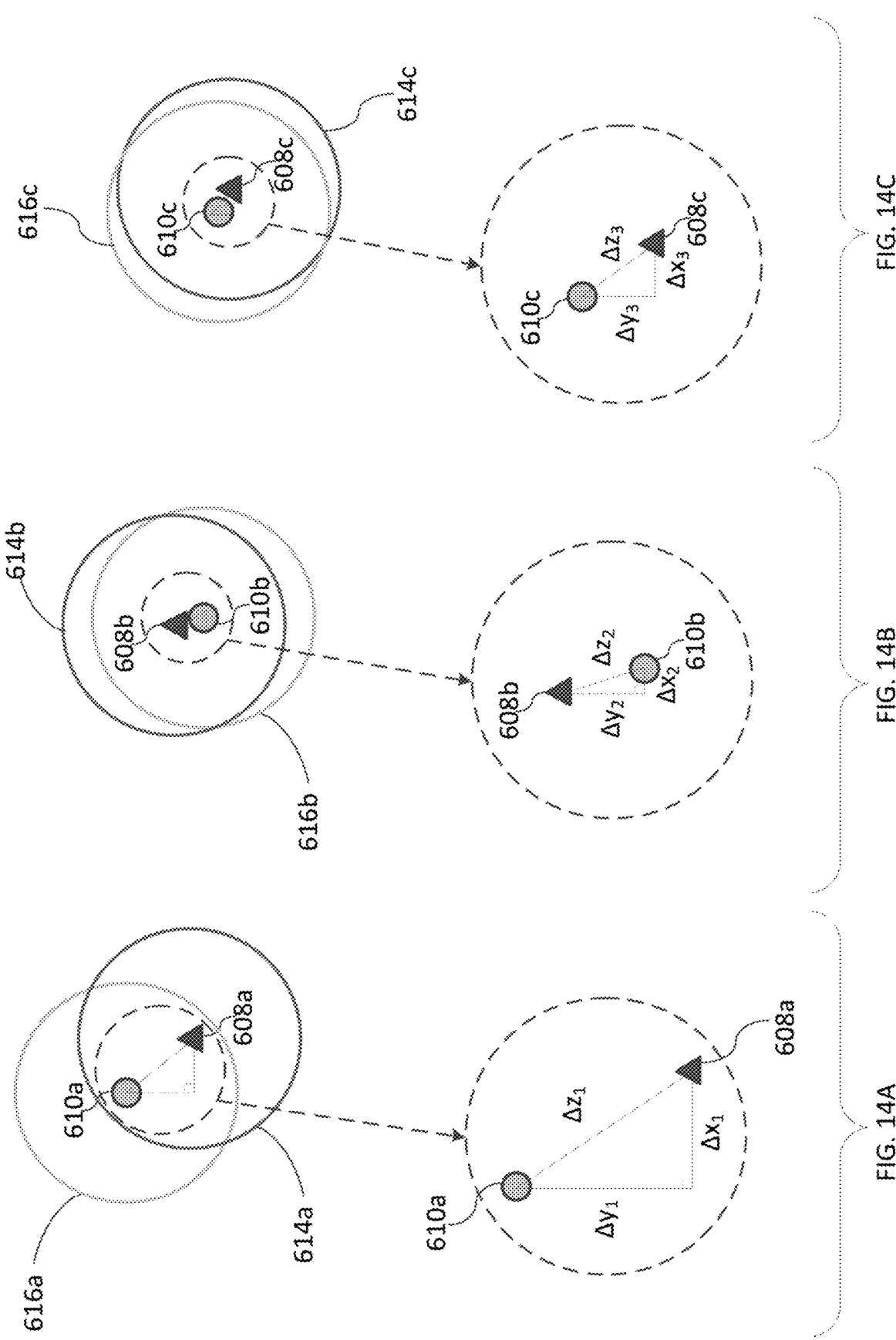
FIG. 14A is a view of the first of three cluster regions for orders one and two to depict the distance between the midpoints of these cluster regions.
FIG. 14B is a view of the second of three cluster regions for orders one and two to depict the distance between the midpoints of these cluster regions.
FIG. 14C is a view of the third of three cluster regions for orders one and two to depict the distance between the midpoints of these cluster regions.
Figure 15:
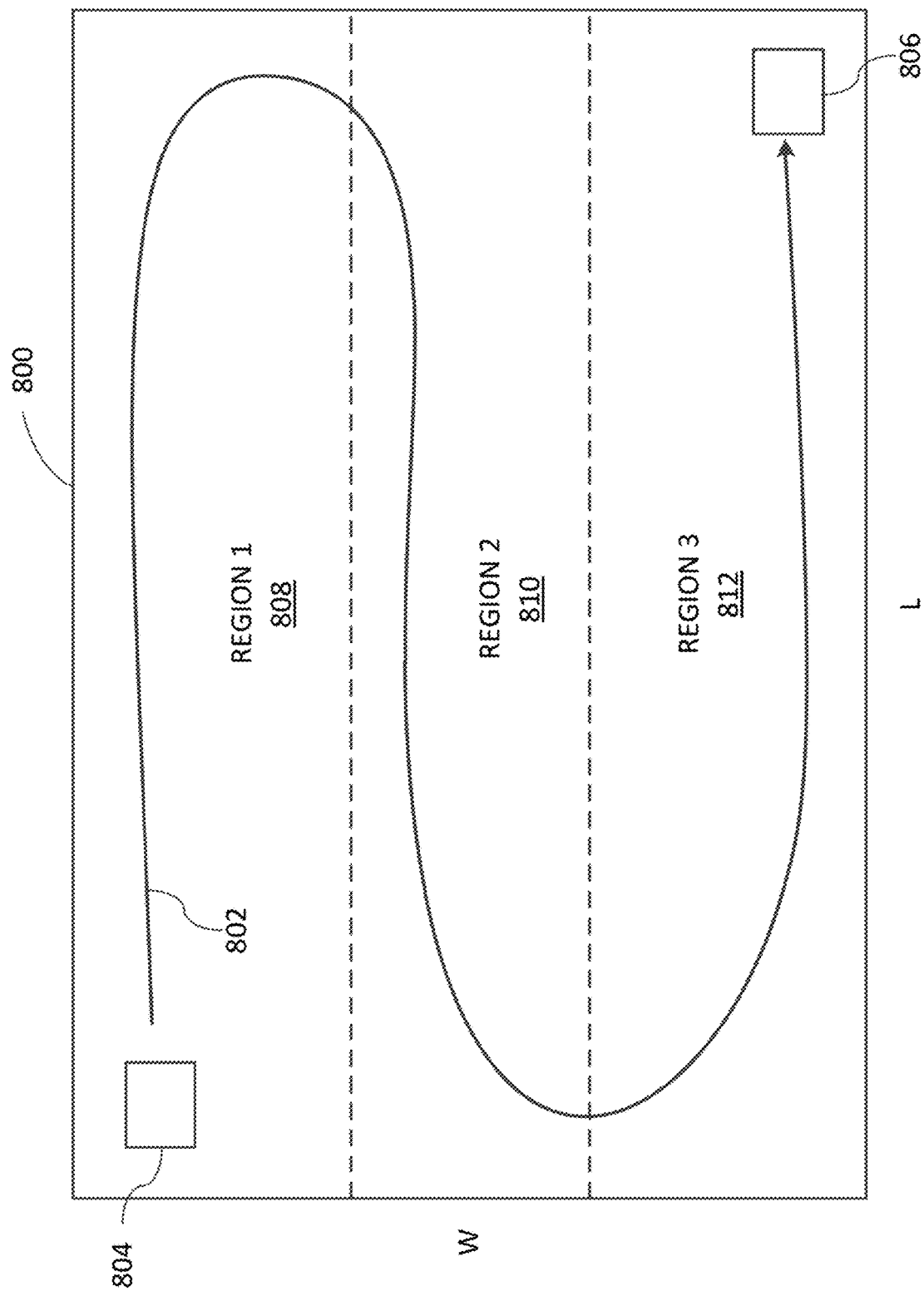
FIG. 15 is a plan view of a portion of a warehouse divided into regions according to an aspect of this invention.

The process for calculating the scores set forth in column 680 of order queue 650 of FIG. 10, is described with respect to FIGS. 13 and 14. Order set 682 is depicted in a different arrangement in FIG. 13 with the midpoints for each order arranged in columns and the data by cluster region being spread across rows. In contrast, FIG. 10 depicts order set 682 with orders arranged in columns with the midpoints arranged across rows. The arrangement of FIG. 13 allows for a better depiction of how the midpoints by cluster region for each order are compared.

Specifically, a distance between the midpoint of each cluster region (1, 2, 3) of the base order to the midpoint of each respective cluster region (1, 2, 3) of each order is made and the three distances are summed in order to determine an aggregate distance between the base order and each other order in the order queue. These aggregate distances may be used as the score relative to the base order. For example, the distance between cluster region 1 of the base order to cluster region 1 of any other order may be calculated as follows:

$$\Delta x = |x1 - xn|,$$

$$\Delta y = |y1 - yn| \quad (2)$$

From $\Delta x$ and $\Delta y$, the distance between the midpoints of the base order and any other order, $\Delta z$, (together forming a right triangle) may be calculated using the Pythagorean theorem as follows:

$$\Delta z = \sqrt{\Delta x2 + \Delta yn} \quad (3)$$

As an example, using the (x, y) coordinates in FIG. 13 for cluster region 1 of order 1 compared to cluster region 1 of order 2, the calculation is as follows:

$$\Delta x1 = |57.56 - 54.83| = 2.73 \text{ meters} \quad (4)$$

$$\Delta y1 = 37.32 - 45.06 = 7.83 \text{ meters} \quad (5)$$

$$\Delta z1 = \sqrt{(2.73)2 + (7.83)2} = 8.29 \text{ meters} \quad (6)$$

The right triangle formed with the locations 608a and 610a for cluster region 1 is depicted in FIG. 14A. The right triangle formed with the locations 608b and 610b for cluster region 2 and the right triangle formed with the locations 608c and 610c for cluster regions 2 and 3, respectively, are depicted in FIGS. 14B and 14C. If the above calculations are repeated for cluster region 2 and cluster region 3 of orders 1 and 2, the distances $\Delta z2$ and $\Delta z3$ may be determined to be 2.05 and 0.56, respectively. From these calculations the aggregate distance between order 1 and order 2 may be summed as follows:

$$\Delta z1 + \Delta z2 + \Delta z3, \text{ or } 8.29 + 2.05 + 0.56 = 10.9 \text{ meter} \quad (7)$$

With rounding to 11 meters, this value is then stored as the score for order 2, as indicated in order queue 650, FIG. 10. This same process may be carried out for all orders in the order queue. When the scores are calculated for all the orders they are sorted in ascending order from 0 (base order).

As described above, an aspect of this invention is directed to grouping orders which are in close proximity to each other to reduce travel time during the order execution process. In order to assess proximity of orders, the location of cluster regions of an order are compared to respective cluster regions of other orders. To better ensure that the respective cluster regions of orders are likely to be in reasonably close proximity, the pick sequence of items from orders during the process for establishing the cluster regions (flow chart 700, FIG. 13) may be optimized. For example, at step 704, the first location from the order is obtained "based on pick sequence." Such a pick sequence may correspond to the location of the items in the warehouse, such as warehouse 800, depicted in FIG. 15 in a plan view.

Order fulfillment warehouses are typically organized such that the items are stored on shelves and bins having physical addresses which may follow a particular order or sequence from one portion of the warehouse (starting location) to another portion of the warehouse (ending portion). In warehouse 800, the path, as indicated by serpentine line 802, may extend from a starting location 804 to an ending location 806, for example. Along the path, the warehouse may be segmented into different regions, such as regions 808, 810, and 812, which regions may be divided along the length (L) of warehouse 800. The warehouse may be further segmented into additional regions, for example, across the width (W), which is not shown.

The maximum number of cluster regions utilized according the process described herein may be established to correspond with the number of regions into which the warehouse is divided. Thus, if the warehouse is divided into three regions, the maximum number of cluster regions used may be limited to three. In setting the pick sequence for items to be selected from the orders during the process of establishing cluster regions, the items may be picked according to the region of the warehouse in which they are located. Thus, the items which are located in region 1 would be selected before the items in region 2. The items in region 3 would be selected last. This would be done regardless of the arrangement of the items in the order. Since the items are picked in order of region, there is a greater likelihood that respective cluster regions (e.g. 1, 2, 3) in which the items are grouped will be in closer in proximity to each other than if the pick sequence was random, i.e., not based on location in the warehouse.

Figure 16:
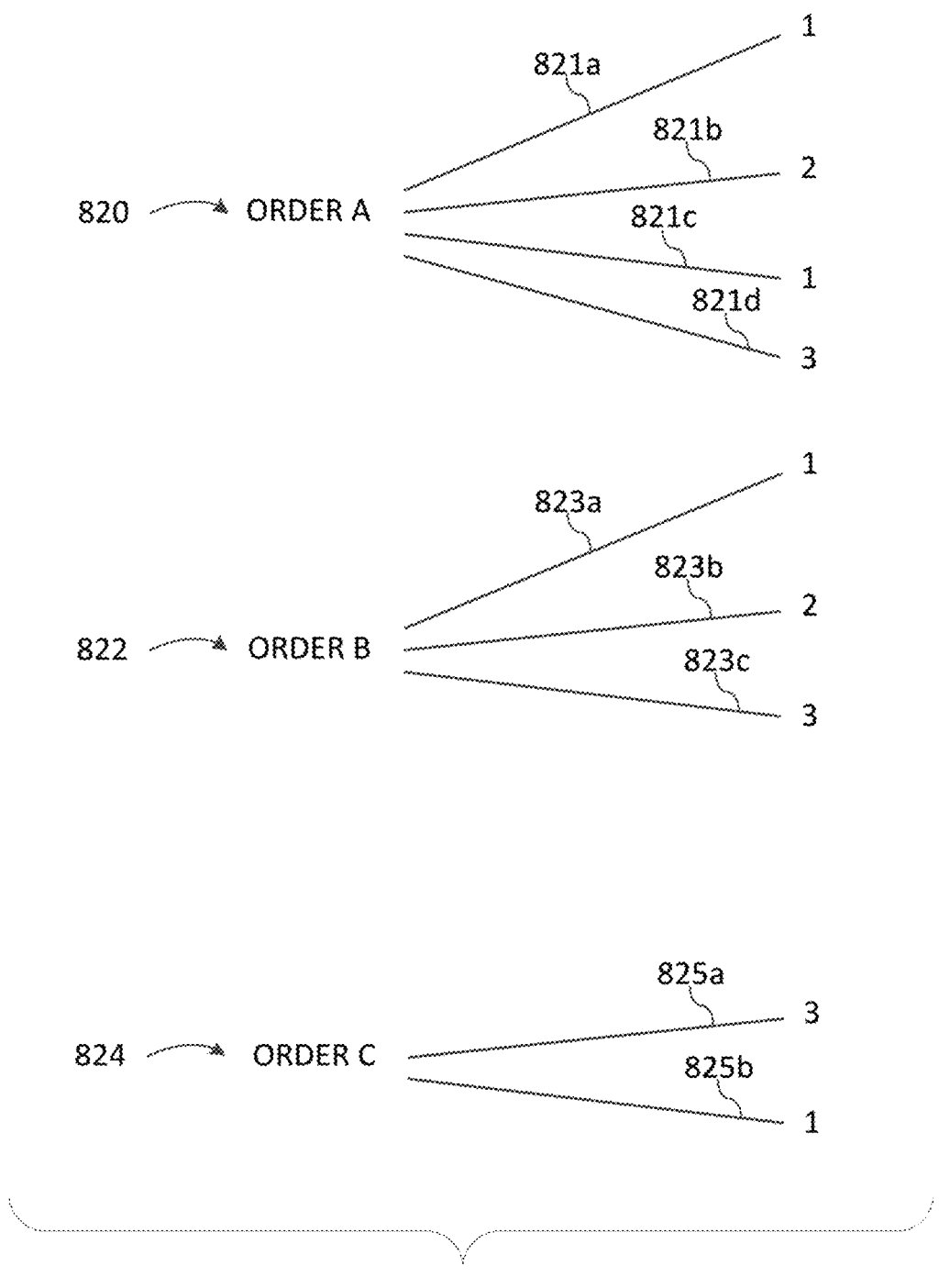
FIG. 16 is an illustration of the individual items in three orders and how they are mapped to regions in the warehouse of FIG. 15.

The above pick sequence process is depicted in FIG. 16, which shows a portion of an order queue 820 having three orders, namely, Order A (820), Order B (822), and Order C (824). In order 820 there are four item 821a-821d which are located in regions 1, 2, 1 and 3, as indicted. Instead of selecting the items in order (821a-821d) for establishing the cluster regions for Order 820, according to flow chart 700, FIG. 13, the items would be selected in the following order: 821a (region 1), 821c (region 1), 821b (region 2), and 821d (region 3). The three items for order 822 would be selected in the following order: 823a (region 1), 823b (region 2), 823c (region 3). The two items for order 824 would be selected in the following order: 825b (region 1) and 825a (region (region 3).

Figure 17:
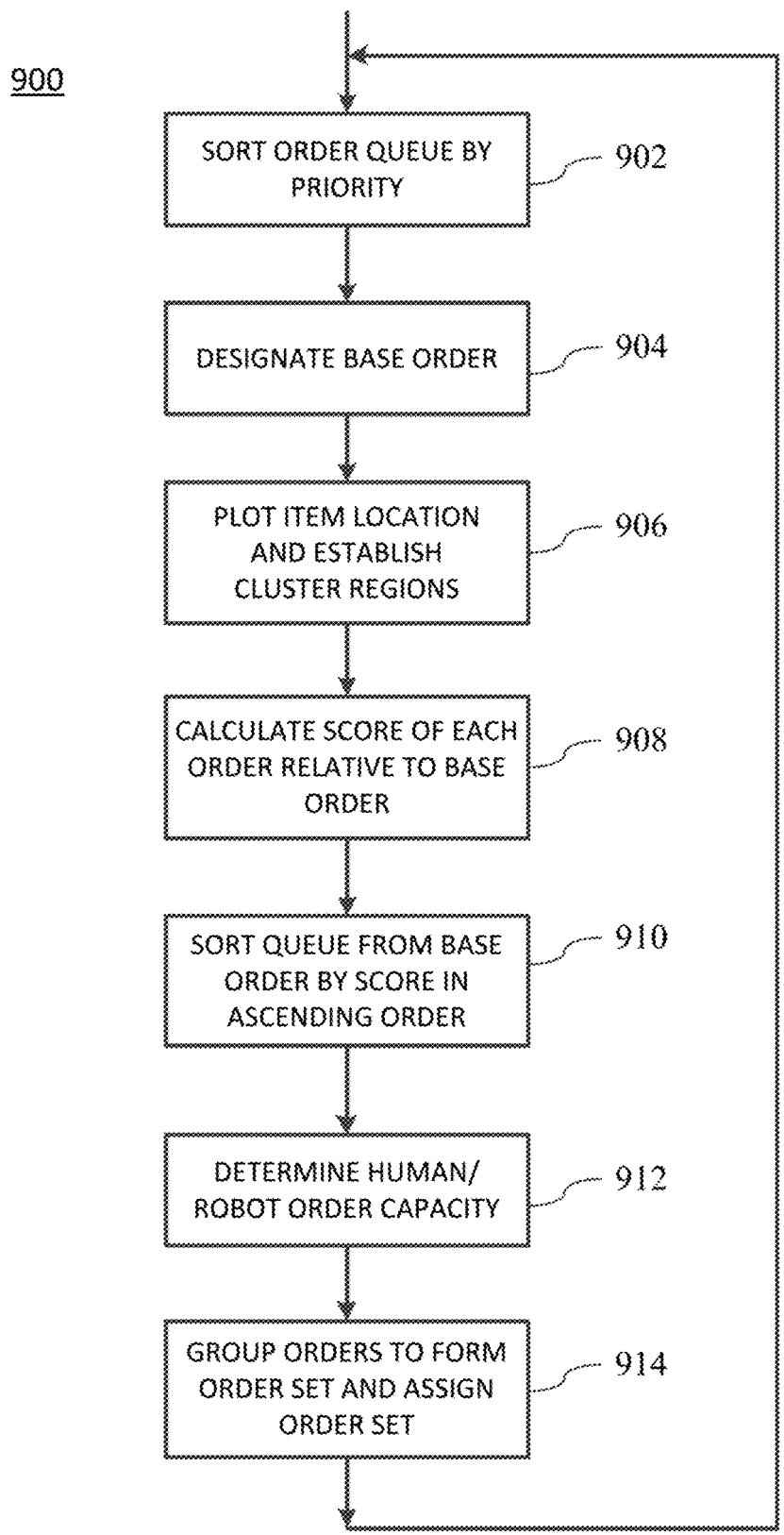
FIG. 17 is a flow chart depicting the order grouping process according to an aspect of this invention.

The general operation of the order grouping and assignment process of the warehouse management system is described with regard to flow chart 900, FIG. 17. At step 902 the order queue is sorted by priority. As described above, the system may do this in various ways, including by service level agreement and/or shipping requirements (e.g. expedited delivery), or in various other ways. The next step 904 is to designate the base order, which may be the first order in the order queue after it has been sorted by priority. The items of each order in the order queue are plotted and the cluster regions are established in step 906. At step 908, the score of each order in the order queue is calculated relative to the base score using the established cluster regions, as described above. The order queue is re-sorted by score in ascending order at step 910, such that the orders with items in closest proximity to the base order are the items with the lowest scores (indicating shortest distance relative to the base order). In step 912, the capacity of the robot (or human) is determined, i.e. the number, n, of compartments/orders that the robot will be able to transport. At step 914 the base order is combined with the subsequent n−1 orders in the queue, where n is the maximum number of orders that the robot is able to transport. The system then returns to step 902 where the queue is resorted by priority and the process continues.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples, embodiments, and.

We claim:

1. A method for grouping a plurality of orders in an order queue of a warehouse management system, each order including one or more items and each item being associated with a physical location in a warehouse, the method comprising:

retrieving, by a processor from a data structure, two dimensional coordinates (x, y) of each of the items in the plurality of orders in a coordinate space defined by the warehouse associated with the physical location in the warehouse of each item in the plurality of orders;

forming, by the processor for each order of the plurality of orders, at least one cluster region defined by a radius, R, about the two dimensional coordinates (x,y) of at least one item from a respective order of the plurality of orders;

grouping, by the processor, the plurality of orders based on the physical locations of the cluster regions in the warehouse to form at least one order set; and assigning, by the processor, the at least one order set to one of a human operator or an autonomous mobile robot by electronically transmitting the at least one order set to one of a handheld electronic device for the human operator or an onboard electronic device for the autonomous mobile robot.

2. The method of claim 1 wherein the step of forming includes, for each item in each of the plurality of orders, determining if the two dimensional coordinates (x, y) are contained within an already established cluster region for the order and, if they are, assigning each such item to the respective cluster region for the order; and, if they are not contained within an already established cluster region, establishing a new cluster region about the two dimensional coordinates (x, y) for each such item in the respective order.

3. The method of claim 2 wherein the step of grouping includes calculating for each order a location for each cluster region and comparing the location of each cluster region in an order to the location of a corresponding cluster region from at least one other of the plurality of orders.

4. The method of claim 3 wherein the location of each cluster region in each of the plurality of orders is determined by calculating an average of the two dimensional coordinates (x, y) of each item in the respective cluster region to obtain a midpoint location for each of the cluster regions.

5. The method of claim 4 wherein the step of grouping further includes establishing a base order and comparing the midpoint of each cluster region in the base order to the midpoint of the corresponding cluster region in each of the other of the plurality of orders to determine the physical location of each cluster region in the base order relative to physical location of the corresponding cluster region in each of the other of the plurality of orders.

6. The method of claim 5 wherein the step of comparing the midpoint of each cluster region in the base order to the midpoint of the corresponding cluster region in each of the other of the plurality of orders includes calculating the distance between the midpoint of each cluster region in the base order to the midpoint of the corresponding cluster region in each of the other of the plurality of orders and summing each calculated distance to determine an aggregate distance between the midpoint of each cluster region in the base order to the midpoint of the corresponding cluster region in each of the other of the plurality of orders.

7. The method of claim 5 wherein the step of grouping further includes combining with the base order at least one other order based on the lowest aggregate distance between the midpoint of each cluster region in the base order to the midpoint of the corresponding cluster region in the at least one other order to form the at least one order set.

8. The method of claim 7 wherein the human operator and the autonomous mobile robot has an order capacity and wherein the number of orders combined to form the at least one order set is based on the capacity of the human operator and the autonomous mobile robot.

9. The method of claim 1 wherein the orders may include pick orders, place orders or maintenance orders.

10. The method of claim 2 wherein there is a maximum number of cluster regions that can be established for each of the orders.

11. The method of claim 10 wherein the step of forming at least one cluster region for each order includes correlating each cluster region to one of a plurality of regions arranged in a sequence in the warehouse.

12. The method of claim 11 wherein the maximum number of cluster regions corresponds to the number of regions in the warehouse, and wherein the step of forming at least one cluster region for each order includes selecting the items from each order for establishing the cluster regions in a sequence based on the sequence of the plurality of regions in the warehouse.

13. A warehouse order system for grouping a plurality of orders in an order queue, the system comprising:

a memory including a plurality of orders in an order queue, each order including one or more items and each item being associated with a physical location in a warehouse;

a processor configured to:

retrieve from a data structure in the memory two dimensional coordinates (x, y) of each of the items in the plurality of orders in a coordinate space defined by the warehouse associated with the physical location in the warehouse of each item in the plurality of orders;

form for each order of the plurality of orders at least one cluster region defined by a radius, R, about the two dimensional coordinates (x, y) of at least one item from a respective order of the plurality of orders; and group the plurality of orders based on the physical locations of the cluster regions in the warehouse to form at least one order set; and assign the at least one order set to one of a human operator or an autonomous mobile robot by electronically transmitting the at least one order set to one of a handheld electronic device for the human operator or an onboard electronic device for the autonomous mobile robot.

14. The warehouse order system of claim 13 wherein the processor is further configured to, for each item in each of the plurality of orders, determine if the two dimensional coordinates (x, y) are contained within an already formed cluster region for the order and, if they are, to assign each such item to the respective cluster region for the order; and, if they are not contained within an already established cluster region, to establish a new cluster region about the two dimensional coordinates (x, y) for each such item in the respective order.

15. The warehouse order system of claim 14 wherein the processor is further configured to calculate for each order a location for each cluster region and to compare the location of each cluster region in an order to the location of a corresponding cluster region from at least one other of the plurality of orders.

16. The warehouse order system of claim 15 wherein the processor is further configured to calculate an average of the two dimensional coordinates (x, y) of each item in the respective cluster region to obtain a midpoint location for each of the cluster regions.

17. The warehouse order system of claim 16 wherein the processor is further configured to establish a base order and to compare the midpoint of each cluster region in the base order to the midpoint of the corresponding cluster region in each of the other of the plurality of orders to determine the physical location of each cluster region in the base order relative to physical location of the corresponding cluster region in each of the other of the plurality of orders.

18. The warehouse order system of claim 17 wherein the processor is further configured to calculate the distance between the midpoint of each cluster region in the base order to the midpoint of the corresponding cluster region in each of the other of the plurality of orders and to sum each calculated distance to determine an aggregate distance between the midpoint of each cluster region in the base order to the midpoint of the corresponding cluster region in each of the other of the plurality of orders.

19. The warehouse order system of claim 18 wherein the processor is further configured to combine with the base order at least one other order based on the lowest aggregate distance between the midpoint of each cluster region in the base order to the midpoint of the corresponding cluster region in the at least one other order to form the at least one order set.

20. The warehouse order system of claim 19 wherein the human operator and the autonomous mobile robot has an order capacity and wherein the number of orders combined to form the at least one order set is based on the capacity of the human operator and the autonomous mobile robot.

21. The warehouse order system of claim 13 wherein the orders may include pick orders, place orders or maintenance orders.

22. The warehouse order system of claim 14 wherein there is a maximum number of cluster regions that can be established for each of the orders.

23. The warehouse order system of claim 22 wherein the processor is further configured to correlate each cluster region to one of a plurality of regions arranged in a sequence in the warehouse.

24. The warehouse order system of claim 23 wherein the maximum number of cluster regions corresponds to the number of regions in the warehouse, and wherein the processor is further configured to select the items from each order for forming the cluster regions in a sequence based on the sequence of the plurality of regions in the warehouse.

* * * * *